United States Patent [19]
Abed et al.

[11] Patent Number: 6,004,680
[45] Date of Patent: Dec. 21, 1999

[54] METHOD OF COATING PRE-PRIMED POLYOLEFIN FILMS

[75] Inventors: Jean-Claude Abed, Charlotte, N.C.; Bobby N. Furr, Fort Mill, S.C.; Bettina E. Bonsall, Bridgewater; Douglas R. Holcomb, South Orange, both of N.J.

[73] Assignee: Hoechst Trespaphan GmbH, Germany

[21] Appl. No.: 09/112,730

[22] Filed: Jul. 9, 1998

[51] Int. Cl.⁶ .......................... B32B 13/12; B32B 27/06; B32B 27/08; B05D 3/00

[52] U.S. Cl. .......................... 428/451; 427/223; 427/322; 427/397.8; 427/403; 427/412.3; 427/536; 427/574; 428/517; 428/518; 428/519; 428/520

[58] Field of Search ................. 427/403, 412.3, 427/397.8, 536, 322, 316, 223, 574, 551, 557; 428/446, 451, 483, 517, 519, 323, 341

[56] References Cited

U.S. PATENT DOCUMENTS

| | | |
|---|---|---|
| 3,282,729 | 11/1966 | Richardson et al. |
| 3,619,272 | 11/1971 | Shepherd et al. |
| 4,254,170 | 3/1981 | Roullet et al. ............................. 428/36 |
| 4,801,487 | 1/1989 | Kalus et al. ............................. 427/379 |
| 5,073,419 | 12/1991 | Kansupada et al. ..................... 428/35.4 |
| 5,087,677 | 2/1992 | Brekner et al. ........................... 526/160 |
| 5,192,620 | 3/1993 | Chu et al. ................................ 428/461 |
| 5,232,755 | 8/1993 | Komiya et al. ....................... 428/36.91 |
| 5,330,794 | 7/1994 | Bosco et al. .......................... 427/393.5 |
| 5,384,192 | 1/1995 | Long et al. .............................. 428/336 |
| 5,487,940 | 1/1996 | Bianchini et al. ....................... 428/349 |
| 5,491,023 | 2/1996 | Tsai et al. ............................... 428/349 |
| 5,665,280 | 9/1997 | Tropsha ................................... 427/387 |
| 5,667,886 | 9/1997 | Gough et al. ............................ 427/387 |

FOREIGN PATENT DOCUMENTS

| | | |
|---|---|---|
| WO 97/44379 | 11/1997 | WIPO . |
| WO 97/47678 | 12/1997 | WIPO . |
| WO 97/47694 | 12/1997 | WIPO . |
| WO 97/47695 | 12/1997 | WIPO . |

*Primary Examiner*—Diana Dudash
*Attorney, Agent, or Firm*—Howson and Howson

[57] ABSTRACT

A method for providing improved adhesion of a waterborne, inorganic barrier coating to polyolefin substrate is described. The method involves corona-treatment of the substrate and applying a barrier coating composition.

The polyolefin substrate is coated with an acrylic primer layer and then an inorganic barrier layer of a copolysilicate of lithium and potassium is applied.

13 Claims, No Drawings

METHOD OF COATING PRE-PRIMED POLYOLEFIN FILMS

BACKGROUND OF THE INVENTION

The coating of thermoplastic polymer substrates with moisture resistant barrier coating compositions to provide impermeability to gases such as oxygen, and liquids, is known. See, e.g., U.S. Pat. No. 3,282,729, which describes applying a water solution of poly(vinyl alcohol) (PVOH) and trimethylolphenol to a thermoplastic polymer substrate at an elevated temperature. Also, for example, U.S. Pat. No. 5,073,419 refers to a film composite comprising a linear low density polyethylene film having a PVOH coat of a thickness of about 0.1 to about 3 mils. U.S. Pat. No. 5,487,940 refers to a metallized polymeric film structure including an oxygen barrier and a moisture barrier. The oxygen barrier includes cross-linked PVOH and the moisture barrier is preferably metallized oriented polypropylene or polyethylene.

Similarly, U.S. Pat. No. 4,254,170 refers to bioriented polyester hollow bodies wherein one wall of a preform is coated with an aqueous composition consisting of at least two incompatible polymers, one of which is a water soluble PVOH and the other, a polymer latex with low water sensitivity.

U.S. Pat. No. 5,384,192 refers to a structure comprising an inorganic oxide substrate having an organic polymer layer. There is an adhesion promoting layer between the substrate and organic polymer layer. One component of the adhesion layer is poly(vinyl phenol), also known as poly (hydroxystyrene).

U.S. Pat. No. 5,192,620 refers to a metallized film composition comprising a polymer substrate having a surface which is modified by an adhesion promoting agent, in which the modified surface is provided with a skin layer of PVOH. The PVOH skin layer is applied by a solution coating process. The skin layer has a metal layer directly thereon.

U.S. Pat. No. 5,491,023 refers to a metallized film composition comprising a polymer substrate having a surface which is modified by an adhesion promoting agent; the modified surface is provided with a skin layer of PVOH. The PVOH skin layer is applied by an extrusion process. The skin layer has a metal layer directly thereon.

Despite the wealth of art in barrier coatings, currently available polymeric films do not accommodate the need in the market for longer shelf life of packaged food. Further, many of these products (e.g., films coated with aluminum) are not microwave-safe, or are not readily disposable (e.g., films coated with poly(vinylidene chloride)), and thus fail to satisfy environmental concerns.

There exists a need in the art for additional compositions and methods which provide improved barrier coatings to polymeric products, e.g., films.

SUMMARY OF THE INVENTION

In one aspect, the present invention provides a method for providing a barrier coating to an acrylic primer polyolefin substrate, preferably a film. The method involves the step of applying to a commercially available pre-primed polypropylene film a waterborne barrier coating solution which forms a dry inorganic barrier layer over the dried primer layer.

In yet another aspect, the present invention provides a barrier-coated pre-primed polyolefin film.

Other aspects and advantages of the present invention are described further in the following detailed description of the preferred embodiments thereof.

DETAILED DESCRIPTION OF THE INVENTION

The present invention provides a method of improving barrier performance by promoting the wetting of waterborne barrier coating solutions on commercially available acrylic pre-primed polyolefin substrates and adhesion of resulting inorganic barrier layers to pre-primed polyolefin substrates by applying a barrier coating solution. The improved adhesion of dried inorganic barrier layers is manifested in improved vapor barrier performance.

I. The Acrylic Primed Commercially Available Films

Examples of pre-primed polypropylene films commercially-available from Mobil Chemical Company include: (a) BICOR® AB, a two-side sealable oriented polypropylene (OPP) film which has been coated on two sides with an acrylic coating; (b) PROCOR® AB-X, a two-side sealable OPP film having acrylic coating on both sides of a polypropylene core and additionally having two adhesion promoting layers between the core and coating layers; (c) BICOR® 150, 170 ASB-X a two-side sealable OPP film having an acrylic coating on one side of a polypropylene core and a sealable poly(vinylidene chloride) (PVdC) coating separated from the core by an adhesion promoting layer, on the other side; (d) BICOR® 110 ASB-X, a two-side sealable OPP film having a polypropylene core with adhesion promoting layers on both sides and coated with an acrylic coating on one side and a sealable PVdC coating on the other; (e) BICOR® 318 ASB, a two-side sealable OPP film having an acrylic coating on one side of a polypropylene core and a sealable PVdC coating; (f) BICOR® 70 PXS is a one-side sealable, PVdC coated OPP film having a "treated layer" on one-side of a polypropylene core and a sealable PVdC coating, separated from the core by an adhesion promoting layer, on the other side; (g) BICOR® AXT, a two-side sealable OPP film having an acrylic coating on one side and a "high barrier" PVdC coating on the other, each coating being separated from the polypropylene core by adhesion promoting layers; and (h) BICOR® 70 HBS-2, a one-side sealable OPP with a sealant layer on one side of a polypropylene core and a high barrier PvdC coating on the other.

II. Waterborne, Inorganic Barrier Coating Compositions Useful in the Invention The method of the invention is useful with a variety of waterborne, inorganic coating compositions, such as those described below, that act as barriers to gases, vapors and aromas.

By "waterborne" is meant coatings that are applied from solutions in which the solvent is primarily water, but which may contain smaller amounts of cosolvents such as, but not limited to, isopropanol.

The term "vapor" implies a liquid at partial pressure, such as water vapor. The term "gas" includes oxygen, nitrogen, carbon dioxide and others. "Aroma" includes those materials which bear a fragrance, for example, menthol and others. For simplicity, as used herein, the term "vapor barrier" can be interpreted to mean a barrier to gases and aromas as well as traditionally defined vapors.

Similarly as used herein, the term "solution" is interpreted to include colloidal dispersions and suspensions. By "colloidal dispersion or suspension" is meant any dispersion or suspension of particles in liquid, the particles being of a size greater than molecular scale that do not settle out. Generally, the particle size in a suspension or dispersion of this invention are from about 10 to about 50,000 Angstroms. "Coating solution" as used herein is meant a liquid containing dissolved or suspended solids that do not settle out and which is used to apply said solids to a substrate.

In one embodiment the inorganic, waterborne coating contains an alkali metal polysilicate, such as sodium polysilicate, potassium polysilicate, or lithium polysilicate or mixtures thereof. Suitable polysilicate coatings may be readily selected from among those known in the art.

For example, the coating solution may contain a copolysilicate, i.e., a mixture of two different alkali metal polysilicates. In a preferred embodiment the barrier coating solution contains a copolysilicate of lithium and potassium represented by the formula, $(Li_2O)_x(K_2O)_{1-x}(SiO_2)_y$, in which the mole fraction of $Li_2O$ is x, the molar ratio of $SiO_2$ to $M_2O$ is y, and $M_2O$ is $(Li_2O)_x(K_2O)_{1-x}$. Suitably, x is between 0 and 0.5 and y has a value greater than 4.6 up to about 10. Alternatively, x is from 0.5 to less than about 1 and y ranges from 1 to about 10. Although less preferred, y may range from 1 to 10, when x is less than 1. See, e.g., WO97/44379 (Nov. 27, 1997).

Another desirable barrier coating contains a selected layered silicate (e.g., the delaminated vermiculite Micro-Lite® product, of W. R. Grace) dispersed in a solid matrix of an alkali metal polysilicate (or mixtures thereof), such that the weight percentage of the layered silicate in the dried barrier coating layer ranges from 1% to 99%. See, WO97/47694 (Dec. 18, 1997). Still other inorganic coatings are described in WO97/47695 (Dec. 18, 1997) and WO97/47678 (Dec. 18, 1997). Selection of these coatings is not a limitation on the present application.

Specific formulations of suitable barrier coatings for use in the method and compositions of this invention are described in more detail in the examples below.

III. Practice of the Method

Advantageously, in the practice of the method of the invention, the pre-primed film promotes good wetting of the subsequently applied coating solution to the substrate and good adhesion of the dried inorganic barrier layer. The latter advantage is manifested in improved vapor barrier performance of coated articles prepared according to the present method.

A. The Substrate

The method of this invention is particularly well suited for use on pre-primed polymeric substrates such as polyolefins, particularly polyethylene, polypropylene, copolymers thereof, and cycloolefinic copolymers (COC) such as a copolymer of ethylene and norbornene [U.S. Pat. No. 5,087,677]. Typically, polypropylene films are biaxially-oriented, depending on the customer requirements. The articles coated by this method include, without limitations, polymeric films, sheets, and other surfaces. Especially preferred articles for coating according to the method of this invention are films made of the foregoing polymers. In a particularly preferred embodiment, the articles are clear coated films manufactured by Mobil Chemical Company under the names of BICOR® or PROCOR®.

Optionally, the primer layer may be plasma treated, corona treated, flame treated, or chemically oxidized or etched before applying a barrier coating solution. Alternatively, the article may bear on at least one surface or side, a heat seal layer. Examples of such heat seal layers are an ethylene-propylene copolymer or ethylene-propylene-butylene terpolymer.

Exemplary polyolefin substrates used in the examples below are the commercially-available primed biaxially oriented polypropylene (BOPP) films produced by Mobil Chemical Company. One preferred film is Type 310 AB which is coated on both sides with an acrylic. Supplemental corona treatment, immediately before applying a coating solution, was found to improve the wet out, uniformity and adhesion of the barrier layer, even for these films that were corona treated at the factory.

The primer layer is dry before application of the waterborne, inorganic coating layer. Following corona treatment, a conventional coating thickness of the selected waterborne inorganic oxide coating solution is applied over the primed film, i.e., typical coating thicknesses as used in the absence of primer, such as between about 100 and about 500 nm on the surface of the substrate. The primer may be applied by any technique known to those of skill in the art. These techniques include, without limitation, roll coating, spray coating, and dip coating techniques. Conventional roll coating techniques include, but are not limited to, rod, roll, reverse roll, forward roll, air knife, knife over roll, blade, gravure and slot die coating methods. General descriptions of these types of coating methods may be found in texts, such as *Modern Coating and Drying Techniques,* (E. Cohen and E. Gutoff, eds; VCH Publishers) New York (1992) and *Web Processing and Converting Technology and Equipment,* (D. Satas, ed; Van Nostrand Reinhold) New York (1984). Three-dimensional articles may be coated by spray coating or dip coating. The method of application is not a limitation on the present invention, but may be selected from among these and other well-known methods by a person of skill in the art.

After coating the article with a barrier coating solution, the resulting product must be dried at a selected temperature at or above room temperature. The selection of the drying temperature depends on the desired time for drying; that is, accelerated drying times may be achieved at elevated temperatures which would not be necessary if a longer time period for drying was acceptable. However, one of skill in the art can readily adjust the oven temperature and exposure as desired. The performance of the dried barrier coating is insensitive to the drying temperature over the range 25–200° C. An advantage of the present method is that barrier coatings can be dried at low temperature (<100° C.) which is necessary when roll-coating polypropylene film.

As one example, a resulting article (e.g., a Mobil BICOR film, 1 mil in thickness) coated according to the method of this invention is typically provided with an oxygen transmission rate (OTR) less than 10 $cm^3/[m^2$ day atm] at 23° C. and 50% relative humidity. In favorable instances an OTR of about less than 5 $cm^3/[m^2$ day atm] at 23° C. and 50% relative humidity can be achieved. This performance has been more reproducibly achieved in pilot scale reverse gravure coating experiments than in spin-coating experiments.

Significantly improved performance can be achieved if the dried barrier coating is covered with a protective top-coat layer. The top-coat may be either a thin (typically, but not necessarily, 1–10 μm thick) coating or a laminated film. Thin top-coatings may be applied by a variety of coating methods: roll coating, spray coating, dip coating. Currently, when utilizing roll coating, it is preferable to use line speeds below 800 feet per minute, and most desirably, below about 500 feet per minute. Laminates may be prepared by melt-extrusion lamination over the barrier coating or by adhesive lamination of a second film. Coated articles prepared according to the present method, when provided with protective top-coat layers, have achieved OTRs of less than 10 $cm^3/[m^2$ day atm] at 23° C. and 50% relative humidity. The laminate offers protection to flexing; performance does not degrade as much when the surface is laminated. The top-coat further provides improved flex resistance, i.e., retention of vapor barrier performance after flexing, and moisture resistance, i.e., retention of vapor barrier performance at high relative humidity.

The following examples illustrate the preferred compositions and methods of the invention. These examples are illustrative only and do not limit the scope of the invention.

EXAMPLES

Example 1

Sterling 7 Pilot Trials 9 January 1997

In this experiment we determined whether Mobil Bicor acrylic pre-primed films would improve the OTR of a lithium-potassium copolysilicate barrier coating (LiK Sil ). We corona-treated the primer of the commercially-primed film before applying a coating solution. Using a Bicor Type 310 AB film, which is pre-primed on both sides, we applied our LiK Sil coating on the inside of the roll (gage 310 (3.1 mil) Bicor). The corona-treatment of the primer layer improved the wet-out, uniformity and adhesion of our barrier layer.

We followed a typical protocol for the preparation of a lithium-potassium copolysilicate, $(Li_2O)_x(K_2O)_{1-x}(SiO_2)_y$, in which the total solids level is 12% by weight and the mole fraction of $Li_2O$, x, and the mole ratio, y, of $SiO_2$ to the combined alkali metal oxides are 0.5 and 3.64, respectively. The lithium polysilicate used was Inobond® Li 2043 lithium polysilicate solution (van Baerle) having 3.0% w/w $Li_2O$ and 24.5% w/w $SiO_2$. The potassium polysilicate used was K-4009 potassium silicate solution (van Baerle) having 13.0% w/w $K_2O$ and 26.85% w/w $SiO_2$. With continuous stirring, Inobond® Li 2043 solution, 53.1 g was diluted with distilled water, 108.1 g, followed by addition of K-4009 polysilicate, 38.8 g.

Following corona treatment, we coated one side of BICOR 120 AB-X with LiK Sil. We used a roll coating process (gravure) to coat the film to a dried thickness of $0.5\mu$ of LiK Sil.

We then quickly dried the film at an oven temperature of 60° C. Oxygen transmission rate (OTR) measurements were made using a Mocon® 2/20 instrument. Measurements were made for each sample at 23° C. and 50% relative humidity.

The results of our experiments on the commercial primed film of Mobil are set forth below in Table I.

TABLE I

Mobil/Bicor Film Barrier Coated

| S60 E# | Coating Solution | Test (OTR) Results | Line Speed |
|---|---|---|---|
| 618-A | 12% LiK 3.6 F8 | 14 | 800 |
| 618-B | 12% LiK 3.6 F8 | 9 | 800 |
| 619-A | 12% LiK 3.6 F5 | 0.385 | 500 |
| 619-B | 12% LiK 3.6 F5 | 4.953 | 500 |
| 620-A | 12% LiK 3.6 F2 | 9.516 | 200 |
| 620-B | 12% LiK 3.6 F2 | 9.031 | 200 |
| 620-E | 12% LiK 3.6 F2 | 10 | 200 |
| 620-F | 12% LiK 3.6 F2 | 8 | 200 |
| 620-G | 12% LiK 3.6 F2 | 8 | 200 |
| 620-H | 12% LiK 3.6 F2 | 6 | 200 |

In conclusion, we observed a barrier performance below 10 $cm^3/[m^2$ day atm] (CMD) at 200, 500 and 800 feet per minute speed on a commercially-available substrate. Typical results with a non pre-primed film would be in the range of 25–70 cmd with higher excursions.

Example 2

Sterling8 Results

Using the same protocol as set forth above, in Example 1, we evaluated the coating conditions at the lower two line speeds (500 and 200). The total solids level in the lithium-potassium copolysilicate was either 18% or 12%, as indicated below in Table II.

All OTR done @ 23° C., 50% RH unless otherwise noted.

TABLE II

Mobil/Bicor Barrier Coated

| S60 E# | Coating Solution | Test Done | Test Result | Line Speed |
|---|---|---|---|---|
| 708-A | (Cor42-2.1)/18% LiKSil 4:1 (F5A) | OTR | 6.936 | 500 ft/in |
| 708-B | (Cor42-2.1)/18% LiKSil 4:1 (F5A) | OTR | 3.824 | |
| 708-C | (Cor42-2.1)/18% LiKSil 4:1 (F5A) | OTR | 7.729 | |
| 708-D | (Cor42-2.1)/18% LiKSil 4:1 (F5A) | OTR | 4.156 | |
| 710-A | (Cor20-2.5)/18% LiKSil 4:1 (F2B) | OTR | 8.564 | 200 ft/in |
| 710-B | (Cor20-2.5)/18% LiKSil 4:1 (F2B) | OTR | 3.845 | |
| 710-C | (Cor20-2.5)/18% LiKSil 4:1 (F2B) | OTR | 4.720 | |
| 710-D | (Cor20-2.5)/18% LiKSil 4:1 (F2B) | OTR | Lost | |
| 711-A | (Cor42-2.1)/18% LiKSil 4:1 (F2B) | OTR | 4.572 | 500 ft/in |
| 711-B | (Cor42-2.1)/18% LiKSil 4:1 (F5B) | OTR | 16 | |
| 711-C | (Cor42-2.1)/18% LiKSil 4:1 (F5B) | OTR | 13 | |
| 711-D | (Cor42-2.1)/18% LiKSil 4:1 (F5B) | OTR | 10 | |
| 713-A | (Cor)/12% LiKSil 4:1 (F2) | OTR | 3.848 | 200 ft/in |
| 713-B | (Cor)/12% LiKSil 4:1 (F2) | OTR | 3.886 | |
| 713-C | (Cor)/12% LiKSil 4:1 (F2) | OTR | 13 | |
| 713-D | (Cor)/12% LiKSil 4:1 (F2) | OTR | 8.052 | |
| 714-A | (Cor)/12% LiKSil 4:1 (F5) | OTR | 21 | 500 ft/in |
| 714-B | (Cor)/12% LiKSil 4:1 (F5) | OTR | 4.313 | |
| 714-C | (Cor)/12% LiKSil 4:1 (F5) | OTR | 5.040 | |
| 714-D | (Cor)/12% LiKSil 4:1 (F5) | OTR | Fail | |

Our tests indicated that at the slower speeds, we found results consistently below 10 OTR.

All documents cited above are hereby incorporated by reference. Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A barrier-coated polyolefin article comprising:
   (a) a polyolefin substrate;
   (b) an acrylic primer layer; and
   (c) an inorganic barrier layer applied from a waterborne coating solution comprising a copolysilicate of lithium and potassium of formula $(Li_2O)_x(K_2O)_{1-x}(SiO_2)_y$ wherein (i) y is greater than 4.6 if x is less than 1 or (ii) x is greater than 0.5 if y is between 1 and 10.

2. The article according to claim 1 wherein said polyolefin substrate is selected from polyethylene, polypropylene, cycloolefinic copolymers, and copolymers thereof.

3. The article according to claim 2 wherein said substrate is a film that contains on at least one side a heat seal layer.

4. The article according to claim 1 wherein said primer layer is plasma treated, corona treated, flame treated or chemically etched/oxidized before application of the inorganic barrier layer.

5. The article according to claim 1 wherein said barrier layer comprises a layered silicate dispersed in a solid matrix of alkali metal polysilicate, wherein the weight fraction of layered silicate in the alkali metal polysilicate ranges from 0.01 to 0.99.

6. The article according to claim 1 further comprising a protective topcoat layer.

7. The article according to claim 1 wherein said substrate is selected from the group consisting of a polymeric film, a polymeric sheet, and a rigid or semi-rigid polymeric container.

8. The article according to claim 1 wherein said substrate is selected from the group consisting of (a) a two-side sealable oriented polypropylene (OPP) film which has been coated on two sides with an acrylic coating;

(b) a two-side sealable OPP film having acrylic coating on both sides of a polypropylene core and additionally having two adhesion promoting layers between the core and coating layers;

(c) a two-side sealable OPP film having an acrylic coating on one side of a polypropylene core and a sealable poly(vinylidene chloride) (PVdC) coating separated from the core by an adhesion promoting layer, on the other side;

(d) a two-side sealable OPP film having a polypropylene core with adhesion promoting layers on both sides and coated with an acrylic coating on one side and a sealable PVdC coating on the other;

(e) a two-side sealable OPP film having an acrylic coating on one side of a polypropylene core and a sealable PVdC coating;

(f) is a one-side sealable, PVdC coated OPP film having a treated layer on one-side of a polypropylene core and a sealable PVdC coating, separated from the core by an adhesion promoting layer, on the other side;

(g) a two-side sealable OPP film having an acrylic coating on one side and a high barrier PVdC coating on the other, each coating being separated from the polypropylene core by adhesion promoting layers; and (h) a one-side sealable OPP with a sealant layer on one side of a polypropylene core and a high barrier PVdC coating on the other.

9. A method for providing a barrier coating to an acrylic primer pre-coated polyolefin substrate comprising the steps of:

(a) applying a waterborne coating solution comprising a copolysilicate of lithium and potassium of formula $Li_2O)_x(K_2O)_{1-x}(SiO)_{2-y}$ wherein (i)y is between 1 and 10, if x is less than 1 or (ii)y is greater than 4.6, if x is 1 to an acrylic primer pre-coated polyolefin substrate; and (b) drying to form a dry inorganic barrier layer over the primer layer.

10. The method according to claim 9 further comprising subjecting said substrate with its pre-applied primer layer to plasma treatment, corona treatment, flame treatment or chemical etching and oxidation prior to application of said barrier coating solution.

11. The method according to claim 9 wherein said barrier layer comprises a layered silicate dispersed in a solid matrix of alkali metal polysilicate, wherein the weight fraction of layered silicate in the alkali metal polysilicate ranges from 1 percent to 99 percent.

12. The method according to claim 9 further comprising applying a protective topcoat layer over said dried barrier layer.

13. The method according to claim 9 wherein the substrate is selected from the group consisting of (a) a two-side sealable oriented polypropylene (OPP) film which has been coated on two sides with an acrylic coating;

(b) a two-side sealable OPP film having acrylic coating on both sides of a polypropylene core and additionally having two adhesion promoting layers between the core and coating layers;

(c) a two-side sealable OPP film having an acrylic coating on one side of a polypropylene core and a sealable polyvinylidene chloride (PVdC) coating separated from the core by an adhesion promoting layer, on the other side;

(d) a two-side sealable OPP film having a polypropylene core with adhesion promoting layers on both sides and coated with an acrylic coating on one side and a sealable PVdC coating on the other;

(e) a two-side sealable OPP film having an acrylic coating on one side of a polypropylene core and a sealable PVdC coating;

(f) is a one-side sealable, PVdC coated OPP film having a treated layer on one-side of a polypropylene core and a sealable PVdC coating, separated from the core by an adhesion promoting layer, on the other side;

(g) a two-side sealable OPP film having an acrylic coating on one side and a high barrier PVdC coating on the other, each coating being separated from the polypropylene core by adhesion promoting layers; and (h) a one-side sealable OPP with a sealant layer on one side of a polypropylene core and a high barrier PVdC coating on the other.

* * * * *